United States Patent
Meriheinä et al.

(10) Patent No.: US 9,518,828 B2
(45) Date of Patent: Dec. 13, 2016

(54) METHOD AND DEVICE FOR MEASURING THE PROGRESS OF A MOVING PERSON

(75) Inventors: Ulf Meriheinä, Söderkulla (FI); Juha Lahtinen, Helsinki (FI)

(73) Assignee: MURATA ELECTRONICS OY, Vantaa (FI)

( * ) Notice: Subject to any disclaimer, the term of this patent is extended or adjusted under 35 U.S.C. 154(b) by 859 days.

(21) Appl. No.: 12/000,997

(22) Filed: Dec. 19, 2007

(65) Prior Publication Data

US 2008/0255800 A1    Oct. 16, 2008

(30) Foreign Application Priority Data

Apr. 13, 2007  (FI) ...................................... 20075254
Nov. 14, 2007  (FI) ...................................... 20075805

(51) Int. Cl.
*G01C 22/00*    (2006.01)
*G01C 21/16*    (2006.01)
(Continued)

(52) U.S. Cl.
CPC ............... *G01C 21/16* (2013.01); *A63B 24/00* (2013.01); *A63B 69/0028* (2013.01);
(Continued)

(58) Field of Classification Search
CPC ..................................................... G01C 21/16
(Continued)

(56) References Cited

U.S. PATENT DOCUMENTS 4,510,944 A * 4/1985 Porges .......................... 600/500
5,788,655 A * 8/1998 Yoshimura ............. A61B 5/222
  600/587

(Continued)

FOREIGN PATENT DOCUMENTS

EP    1 764 581 A1    3/2007
EP    1 862 765 A1    12/2007
(Continued)

OTHER PUBLICATIONS

International Search Report PCT/FI2008/050180 filed Apr. 11, 2008.
(Continued)

*Primary Examiner* — Sujoy Kundu
*Assistant Examiner* — Ricky Ngon
(74) *Attorney, Agent, or Firm* — Squire Patton Boggs (US) LLP

(57) ABSTRACT

The invention relates to measuring devices to be used in physical measuring, and more particularly, to a method and a device for measuring the progress of a moving person. In the solution according to the invention the quantities describing the progress of the moving person are being calculated based on step cycle-specific acceleration stage characteristic accelerations a+ and step cycle-specific braking stage characteristic acceleration a− obtained from acceleration values measured by means of an acceleration sensor, and on the measured time. The invention aims at providing a solution, better and simpler than prior solutions, for measuring the progress of a moving person, which solution is applicable for use in a multitude of measuring solutions for ways of locomotion of various types.

28 Claims, 3 Drawing Sheets

(51) Int. Cl.
*A63B 24/00* (2006.01)
*A63B 69/00* (2006.01)

(52) U.S. Cl.
CPC ........ *G01C 22/006* (2013.01); *A63B 2220/17* (2013.01); *A63B 2220/40* (2013.01); *A63B 2220/803* (2013.01)

(58) Field of Classification Search
USPC ... 702/149, 150, 160, 141, 142, 79, 78, 189, 702/190, 194, 199; 235/105, 95 R, 96, 97, 235/95 A, 235/95 C; 73/490, 510; 701/207
See application file for complete search history.

(56) References Cited

U.S. PATENT DOCUMENTS

| | | | |
|---|---|---|---|
| 6,266,623 B1 * | 7/2001 | Vock et al. | 702/44 |
| 6,305,221 B1 | 10/2001 | Hutchings | |
| 7,457,719 B1 * | 11/2008 | Kahn et al. | 702/141 |
| 2003/0018430 A1 | 1/2003 | Ladetto et al. | |
| 2003/0191582 A1 * | 10/2003 | Terada | 701/207 |
| 2005/0021292 A1 | 1/2005 | Vock et al. | |
| 2005/0038626 A1 * | 2/2005 | Flentov et al. | 702/141 |
| 2007/0062279 A1 | 3/2007 | Chan et al. | |
| 2007/0067105 A1 | 3/2007 | Lee et al. | |
| 2007/0143068 A1 * | 6/2007 | Pasolini et al. | 702/160 |
| 2008/0096726 A1 * | 4/2008 | Riley et al. | 482/8 |
| 2009/0018794 A1 * | 1/2009 | Meriheina | 702/141 |

FOREIGN PATENT DOCUMENTS

| | | |
|---|---|---|
| JP | 2-161932 | 6/1990 |
| JP | 7-80115 | 3/1995 |
| JP | 07-144039 A | 6/1995 |
| JP | 2002-306628 A | 10/2002 |
| JP | 2003-302419 A | 10/2003 |
| JP | 2005-058759 A | 3/2005 |
| JP | 2005-078416 A | 3/2005 |
| JP | 2005-114537 A | 4/2005 |
| JP | 2005-237926 A | 9/2005 |
| JP | 2006-118909 A | 5/2006 |
| JP | 2006-322945 A | 11/2006 |
| WO | WO 2005/004719 A1 | 1/2005 |
| WO | WO 2007/000282 A2 | 1/2007 |
| WO | WO 2007/017471 A1 | 2/2007 |

OTHER PUBLICATIONS

Notification of Reasons for Refusal dated Aug. 28, 2012 corresponding to Japanese Patent Application No. 2010-502537.

* cited by examiner

METHOD AND DEVICE FOR MEASURING THE PROGRESS OF A MOVING PERSON

FIELD OF THE INVENTION

The invention relates to measuring devices for use in physical measuring, and more specifically to a method and a device for measuring the progress of a moving person. The invention aims at providing a solution, better and simpler than prior ones, for measuring the progress of a moving person, which solution is applicable for use in a multitude of measuring solutions for different types of locomotion.

BACKGROUND OF THE INVENTION

In performing navigation based on inertia sensors, e.g. acceleration or angular velocity sensors, (inertia navigation), if the sensor signal is being integrated, it is important that the integration time is not extended too much, thus excessively increasing the error in position or direction caused by measuring errors of the sensor. In order to prevent that, the aim often is to divide the motion into periodically repetitive cycles of sufficient brevity. The method is called step-by-step navigation. In athletics coaching and competitions and in fitness exercise and other outdoor activities, such step-by-step navigation is important, wherein e.g. the speed of progress, the distance covered, the direction, the step rate (cadence), and the step time, as well as the step length are being measured. The way of locomotion can be e.g. running, walking, pole walking, competitive walking, cross-country skiing, downhill sports, roller skiing, roller-skating, skating, swimming, rowing, paddling or the like, where cyclic motion is present.

Inertia navigation can work independently, or it can be used in combination with satellite navigation, in order to improve the accuracy of the satellite navigation, particularly in areas of poor coverage of the satellite signal, for diagnostic purposes in satellite positioning in error situations, or in order to reduce the power consumption of satellite navigation by means of increasing the intervals between instances of reception of the satellite signal.

In prior art, several solutions exist aiming at measuring the distance covered by using an acceleration sensor. In inertia navigation, for example, an acceleration sensor is most often used for measuring the distance covered. By means of the acceleration sensor, the contact time for the foot, i.e. the time during which the foot touches the ground, can be measured. For instance, the US Patent Publication U.S. Pat. No. 4,578,769 discloses such a solution according to prior art. The method described in said Patent Publication provides good results for high running speeds, but it is not robust for slow running, nor for walking, where the event of the foot leaving the ground is difficult to detect.

The acceleration sensor can be a simple switch or the like, which simply counts the number of steps and estimates the distance based on the number of steps, and the speed based on the cadence. These devices are called pedometers.

As a solution in a slightly more advanced system according to prior art, the actual motion of the walker can be measured at the foot by means of an acceleration sensor. Such solutions according to prior art are disclosed in e.g. the US Patent Application US 2002/0040601, the US Patent Publication U.S. Pat. No. 5,955,667 and in the Canadian Patent Publication CA 2,218,242.

In the aforementioned patent publication, measuring signals from a multitude of acceleration sensors and angular motion sensors are combined, and significantly improved precision is achieved compared to the one for pedometers or contact time measurements. In these solutions according to prior art, the drawbacks, however, are the required number of sensors, a linear acceleration sensor as well as an angular motion sensor, for compensating the error caused by the earth's gravitational force, through the inclination and its variation, as well as the complexity of the algorithm, which manifest themselves in the size of the system, its costs, and power consumption.

In order to simplify the measuring system described above, a solution according to prior art has been disclosed, for using an acceleration sensor in such a way, that knowledge of the period of time the foot stays immobile, as it is on the ground, is being utilized and thus, the aim has been to improve the precision through automatic resetting. A solution according to prior art with such a technique is disclosed in e.g. US Patent Publication U.S. Pat. No. 6,356,856. The method described in said Patent Publication suffers, however, from inaccuracy, when the inclination changes during the motion. Computing is complex in this case as well, and requires power and program storage capacity.

One solution according to prior art, for detecting motion and for measuring the duration of movement is a disclosed method based on an acceleration sensor. Such a prior art solution is disclosed, for example, in the US Patent Publication U.S. Pat. No. 6,298,314.

A further solution according to prior art for a general device for measuring the movement of an athlete is disclosed, for example, in US Patent Publication U.S. Pat. No. 7,092,846 and in the International Patent Application Publication WO 00/20874.

SUMMARY OF THE INVENTION

The object of the invention is an improved method and device for measuring the progress of a moving person. By means of the method and the device according to this invention, a precision is achieved equaling that of the best methods presented above, but with an implementation solution of significantly reduced complexity, using one acceleration sensor without any inclination compensation. The sensor solution according to the invention is applicable for use is a multitude of solutions for measuring different types of locomotion.

According to a first aspect of the invention, a method is provided for measuring the progress of a moving person such, that at least one of the following quantities describing the progress of the moving person: speed, step rate, step count, step length, distance and way of progress, is calculated by means of step cycle-specific acceleration stage characteristic accelerations a+ and braking stage characteristic accelerations a− obtained from the acceleration values measured by means of an acceleration sensor, and by means of the measured time.

Preferably, the step cycle-specific acceleration stage characteristic accelerations a+ are obtained as the maxima of measured acceleration values and braking stage characteristic accelerations a− are obtained as the minima of the step cycle-specific measured acceleration values.

Alternatively, the step cycle-specific acceleration stage characteristic accelerations a+ are obtained as the maxima for each step cycle of the analogically filtered acceleration sensor signals $a_{in}$ and braking stage characteristic accelerations a− are obtained as minima for each step cycle of the analogically filtered acceleration sensor signals $a_{in}$.

Further, alternatively, the step cycle-specific acceleration stage characteristic accelerations a+ are obtained as the maxima for each step cycle of the digitally filtered acceleration sensor signals $a_{in}$ and braking stage characteristic accelerations a− are obtained as the minima for each step cycle of the digitally filtered acceleration sensor signals $a_{in}$.

Further, alternatively, the step cycle-specific acceleration stage characteristic accelerations a+ are obtained as mean values for each step cycle of the digitally filtered acceleration sensor signals $a_{in}$ over times selected during the positive half-cycle and braking stage characteristic accelerations a− stage are obtained as step-cycle specific mean values of the digitally filtered acceleration sensor signals $a_{in}$ over times selected during the negative half-cycle. Further, preferably, the function to be used in the digital filtering is:

$$a_{out}=a_{in}/\sqrt{[1+(f/f_0)^2]},$$

where f is the frequency and $f_0$ is a suitably selected boundary frequency.

Further, alternatively, the step cycle-specific acceleration stage characteristic accelerations a+ are obtained as the maxima for each step cycle of the signals $a_{in}$ from the acceleration sensor filtered with digital weighting and the braking stage characteristic accelerations a− are obtained as the minima for each step cycle of the signals $a_{in}$ from the acceleration sensor filtered with digital weighting.

Further, alternatively, the step cycle-specific acceleration stage characteristic accelerations a+ are obtained as mean values for each step cycle of the signals $a_{in}$ from the acceleration sensor filtered with digital weighting over times selected during the positive half-cycle and braking stage characteristic accelerations a− are obtained as mean values for each step cycle of the signals $a_{in}$ from the acceleration sensor filtered with digital weighting over times selected during the negative half-cycle. Further, preferably, the function to be used in the digital weighted filtering is:

$$a_{out}(n)=(1-k)*a_{out}(n-1)+a_{in}*k,$$

where n indicates the n:th sample and k is the weighting factor.

Preferably, the speed v is calculated based on the characteristic accelerations a+ and/or a− as follows:

$$v=f(a+)=k*|a+|, \text{ or}$$

$$v=f(a-)=k*|a-|,$$

where k is a constant.

Preferably, in calculating the quantities describing the progress of a moving person, the time used up in one pair of steps $\Delta t_{pos}$ is obtained as the time interval between two equivalent points, such as a maximum, a minimum, or a point, where the graph exceeds or falls below a certain value, on the acceleration graph given by the measured acceleration values.

Preferably, the step length $s_{step}$, or the length of one pair of steps $s_{pos}$, is calculated using the formula:

$$s_{step} = \frac{1}{2}*v*\Delta t_{pos} \text{ or } s_{pos} = v*\Delta t_{pos}.$$

Preferably, the rate of pairs of steps $f_{pos}$, or the step rate $f_{step}$, is calculated using the formula:

$$f_{pos}=1/\Delta t_{pos} \text{ or } f_{step}=2/\Delta t_{pos}.$$

Further, preferably, the count of pairs of steps n is calculated on the basis of the number n of equivalent points, such as a maximum, a minimum, or a point where the graph exceeds or falls below a certain value, on the acceleration graph given by the measured acceleration values.

Further, preferably, the distance covered s is calculated as the sum of the step lengths or of the lengths of pairs of steps:

$$s = 2*\sum_{i=1}^{n} s_{step}(i) \text{ or } s = \sum_{i=1}^{n} s_{pos}(i).$$

Preferably, the method distinguishes between ways of locomotion, like walking, running, and skiing, based on acceleration maximum and minimum, the characteristic acceleration values a+ and a− and/or the step rate. Preferably, the method makes an individual calibration for each way of locomotion, like running, walking, pole walking, or cross-country skiing. Preferably, the method is applied for use in step-by-step navigation.

According to a second aspect of the invention a device is provided for measuring the progress of a moving person such, that the device is adapted to measure acceleration and time such, that at least one of the following quantities describing the progress of the moving person: speed, step rate, step count, step length, distance and way of progress, is calculated by means of the step cycle-specific acceleration stage characteristic accelerations a+ and braking stage characteristic accelerations a− obtained from the acceleration values measured by the acceleration sensor, and by means of the measured time.

Preferably, the device is adapted to determine the step-cycle specific acceleration stage characteristic accelerations a+ as the maxima of the step-cycle specific measured acceleration values and braking stage characteristic accelerations a− as the minima of the step cycle-specific measured acceleration values.

Alternatively, the device is adapted to determine the step cycle-specific acceleration stage characteristic accelerations a+ as maxima for each step cycle of the analogically filtered acceleration sensor signals $a_{in}$ and braking stage characteristic accelerations a− as the minima for each step cycle of the analogically filtered acceleration sensor signals $a_{in}$.

Further, alternatively, the device is adapted to determine the step cycle-specific acceleration stage characteristic accelerations a+ as the maxima for each step cycle of the digitally filtered acceleration sensor signals $a_{in}$ and braking stage characteristic accelerations a− as the minima for each step cycle of the digitally filtered acceleration sensor signals $a_{in}$.

Further, alternatively, the device is adapted to determine the step cycle-specific acceleration stage characteristic accelerations a+ as mean values for each step cycle of the digitally filtered acceleration sensor signals $a_{in}$ over times selected during the positive half-cycle, and braking stage characteristic accelerations a− as mean values for each step cycle of the digitally filtered acceleration sensor signals $a_{in}$ over times selected during the negative half-cycle. Further, preferably, the device is adapted to use the following function in the digital filtering:

$$a_{out}=a_{in}/\sqrt{[1+(f/f_0)^2]},$$

where f is the frequency and $f_0$ is a suitably selected boundary frequency.

Further, alternatively, the device is adapted to determine the step cycle-specific acceleration stage characteristic accelerations a+ as the maxima for each step cycle of the signals $a_{in}$ from the acceleration sensor filtered with digital weighting and braking stage characteristic accelerations a− as the minima for each step cycle of the signals $a_{in}$ from the acceleration sensor filtered with digital weighting.

Further, alternatively, the device is adapted to determine the step cycle-specific acceleration stage characteristic accelerations a+ as mean values for each step cycle of the signals $a_{in}$ from the acceleration sensor filtered with digital weighting over times selected during the positive half-cycle, and braking stage characteristic accelerations a− as mean values for each step cycle of the signals $a_{in}$ from the acceleration sensor filtered with digital weighting over times selected during the negative half-cycle. Further, preferably, the device is adapted to use the following function in the digital weighted filtering:

$$a_{out}(n)=(1-k)*a_{out}(n-1)+a_{in}*k,$$

where n indicates the n:th sample and k is the weighting factor.

Preferably, the device is adapted to calculate the speed v based on the characteristic accelerations a+ and/or a− as follows:

$$v=f(a+)=k*|a+|, \text{ or}$$

$$v=f(a-)=k*|a-|,$$

where k is a constant.

Preferably, the device is adapted to determine the time used up in one pair of steps $\Delta t_{pos}$ as the time interval between two equivalent points, such as a maximum, a minimum, or a point, where the graph exceeds or falls below a certain value, on the acceleration graph given by the measured acceleration values.

Preferably, the device is adapted to calculate the step length $s_{step}$ or the length of one pair of steps $s_{pos}$ using the formula:

$$s_{step} = \frac{1}{2} * v * \Delta t_{pos} \text{ or } s_{pos} = v * \Delta t_{pos}.$$

Preferably, the device is adapted to calculate the rate of pairs of steps $f_{pos}$ or the step rate $f_{step}$ using the formula:

$$f_{pos}=1/\Delta t_{pos} \text{ or } f_{step}=2/\Delta t_{pos}.$$

Further, preferably, the device is adapted to calculate the count of pairs of steps n on the basis of the number n of equivalent points, such as a maximum, a minimum, or a point where the graph exceeds or falls below a certain value, on the acceleration graph given by the measured acceleration values.

Further, preferably, the device is adapted to calculate the distance covered s as the sum of the lengths of the steps or of the pairs of steps:

$$s = 2 * \sum_{i=1}^{n} s_{step}(i) \text{ or } s = \sum_{i=1}^{n} s_{pos}(i).$$

Preferably, the device is adapted to distinguish between ways of progress, like walking, running, and skiing, based on acceleration maximum and minimum, the characteristic acceleration values a+ and a− and/or the step rate. Preferably, the device is adapted to make an individual calibration for each way of progress, like running, walking, pole walking, or cross-country skiing.

Preferably, the device is adapted to be used in step-by-step navigation. Further, preferably, it is adapted to cooperate with an altimeter, satellite navigation devices and/or a magnetometer. Further, preferably, the device is adapted to receive and/or utilize data in map databases and/or data about terrain inclinations.

According to a third aspect of the invention, a piece of footwear is provided, such that the piece of footwear comprises a device, as described above, for measuring the progress of a moving person.

According to a fourth aspect of the invention, a device to be positioned at a moving person's middle is provided such, that the device comprises a device, as described above, for measuring the progress of the moving person.

According to a fifth aspect of the invention a device to be positioned at the arm of a moving person is provided, such that the device comprises a device, as described above, for measuring the progress of the moving person.

According to a sixth aspect of the invention a display unit for a moving person is provided such, that the display unit for the moving person is adapted to cooperate with a device, as described above, measuring the progress of the moving person.

According to a seventh aspect of the invention a system for measuring the progress of a moving person is provided, such that the system comprises a device, as described above, for measuring the progress of the moving person, and, adapted to cooperate with this device, a display unit for the moving person.

Preferably, said device for measuring the progress of a moving person and said display unit for the moving person are integrated in one device.

BRIEF DESCRIPTION OF THE DRAWINGS

Below, the invention and its preferred embodiments are described in detail with exemplary reference to the enclosed figures, of which.

DETAILED DESCRIPTION OF THE INVENTION

Figure 1:
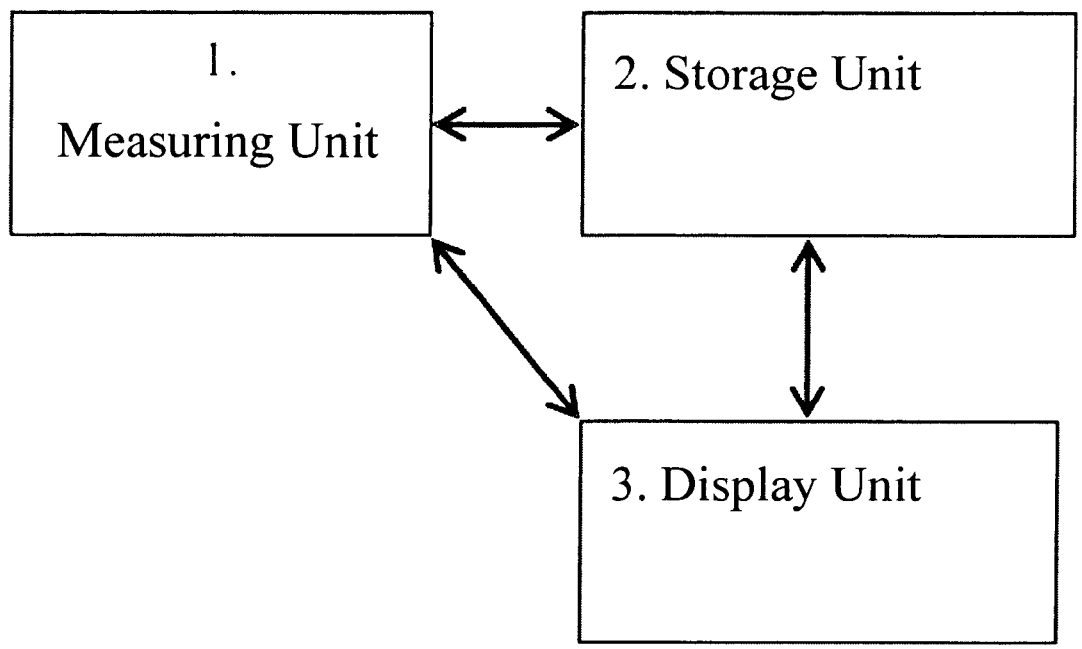
FIG. 1 shows a diagram of a measuring apparatus according to the invention.

FIG. 1 shows a diagram of a measuring apparatus according to the invention. The apparatus can consist of a measuring unit 1, a storage unit 2 and a display unit 3. These communicate with each other using wireless or wired connections. Some of the units, or all of them, can be integrated in the same casing or unit. The measuring unit is attached to the human body, e.g. to a limb or to the middle. Typically, the measuring unit is located at the foot, integrated in a shoe, or attached to the strings. The display unit is typically located in a clearly visible position. For example, it can be integrated in the measuring unit or the storage unit, or it can be separate. It can also be part of a watch, a satellite navigator, a mobile terminal, a radio receiver, a player, or the like. Any calibration data for the measuring device are stored in one unit or in several units.

Figure 2:
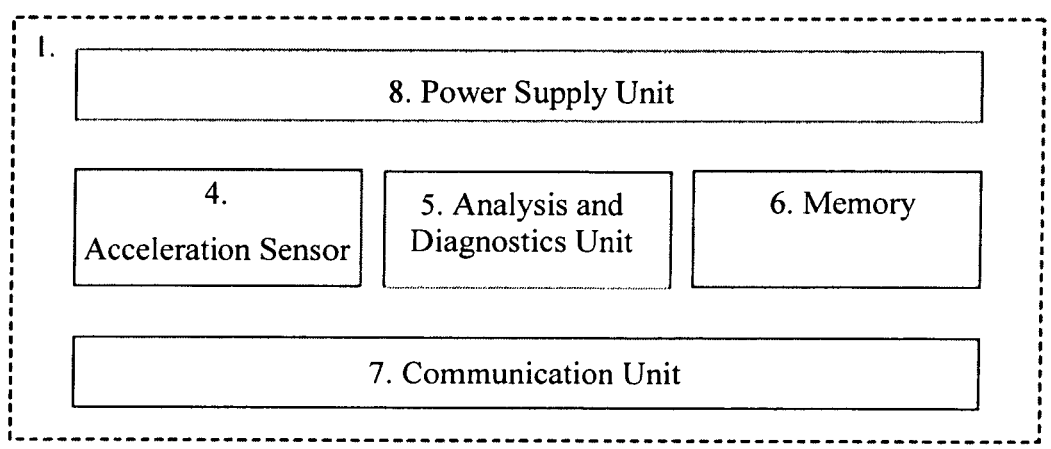
FIG. 2 shows a view of a measuring unit according to the invention.

FIG. 2 shows a view of a measuring unit according to the invention. The measuring unit 1 can comprise an acceleration sensor 4 of 1 . . . 3 axes, a unit 5 for analysis and diagnostics of the acceleration data, a volatile and a non-volatile memory 6, a communication unit 7, and a power supply unit 8, e.g. a battery, an accumulator, a harvester or the like. The analysis unit can, for example, be based on a micro processor or a DSP (Digital Signal Processor). The memory stores, for instance, user data, calibration data, measurement data and other log data. The communication unit comprises, for example, a transfer protocol generator, a required interface, or a radio transmitter, a receiver and an antenna.

Figure 3:
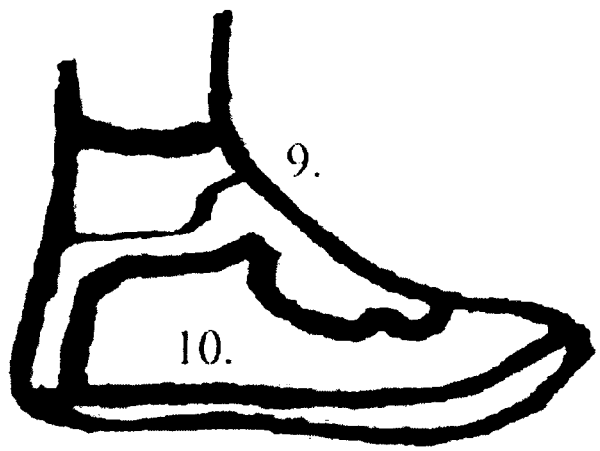
FIG. 3 shows a diagram of positioning a measuring unit, according to the invention, into a piece of footwear.

FIG. 3 shows a diagram of positioning a measuring unit, according to the invention, into a piece of footwear. The measuring unit can be positioned, for example, attached to the shoestrings 9, or, due to its small size, installed inside the piece of footwear or in the sole 10.

Figure 4:
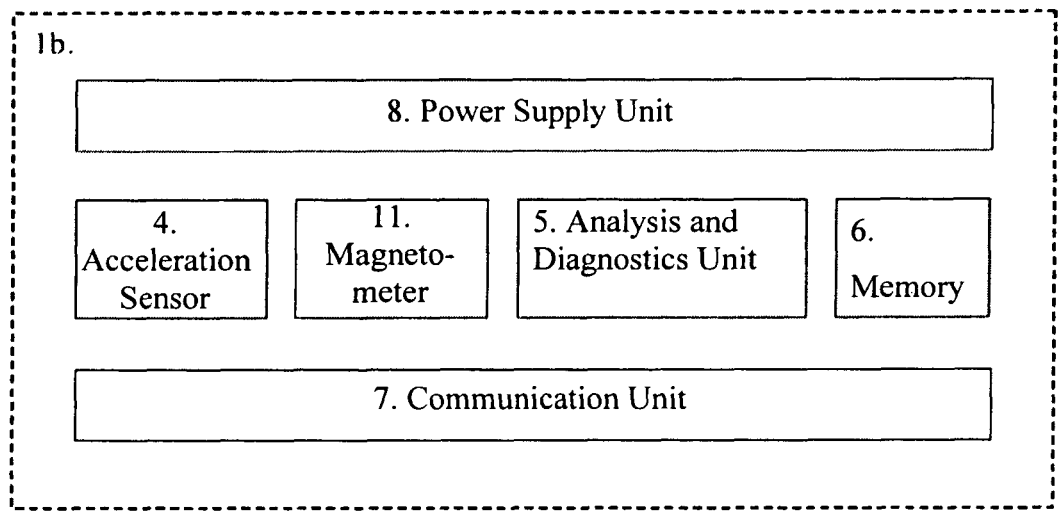
FIG. 4 shows a view of an alternative measuring unit, according to the invention.

FIG. 4 shows a view of an alternative measuring unit, according to the invention. If, in addition to the speed and the distance covered, one wants to know the traveled route, a magnetometer 11 of 2 . . . 3 axes can be added to the alternative measuring unit for determining the compass reading for each step or once in a while.

In the solution according to the invention, the acceleration of the cyclic motion of the progress is being measured in one or more directions. From the acceleration values measured during each step cycle, an acceleration stage characteristic acceleration a+ occurring during the positive half cycle and, respectively, a braking stage characteristic acceleration a− occurring during the negative half cycle.

As values of the acceleration stage characteristic acceleration a+ and the braking stage characteristic acceleration a− are defined accelerations, that clearly differ from zero, whereby the influence of the zero point error in the acceleration sensor or of the coupling of gravitation, caused by inclination, on the metering signal is minimal, since those values are clearly lower than the values a+ and a−.

In a solution according to the invention, the acceleration stage characteristic acceleration a+ and the braking stage characteristic acceleration a− can be defined, for example, directly as the maximum and the minimum acceleration value measured from the raw data of the acceleration sensor. Alternatively, in a solution according to the invention, the values a+ and a− can be defined by filtering the acceleration sensor signal $a_{in}$ analogically by, for example, mechanical damping of the signal $a_{in}$.

Further, alternatively, in a solution according to the invention, the values a+ and a− can be defined by filtering the acceleration sensor signal $a_{in}$ digitally, by means of, for example, a RC filter. In this case, the function used in the first stage filtering could be, for instance:

$$a_{out} = a_{in} / \sqrt{[1+(f/f_0)^2]},$$

where f=frequency and $f_0$=the boundary frequency for −3 dB and the values a+ and a− can be defined based on this filtered signal as, for example, the maximum and/or the minimum of the filtered acceleration value.

Further, alternatively, in the solution according to the invention, the values a+ and a− can be defined by filtering the acceleration sensor signal $a_{in}$ by means of digital weighting. Here, the function to be used in the digital weighting could be, for instance:

$$a_{out}(n) = (1-k)*a_{out}(n-1) + a_{in}*k,$$

where n indicates the n:th sample and k is the weighting factor.

Further, alternatively, in a solution according to the invention, the values a+ and a− can be defined by using a mean value calculated from the measured acceleration value over times selected during the positive and/or the negative half cycle.

Figure 5:
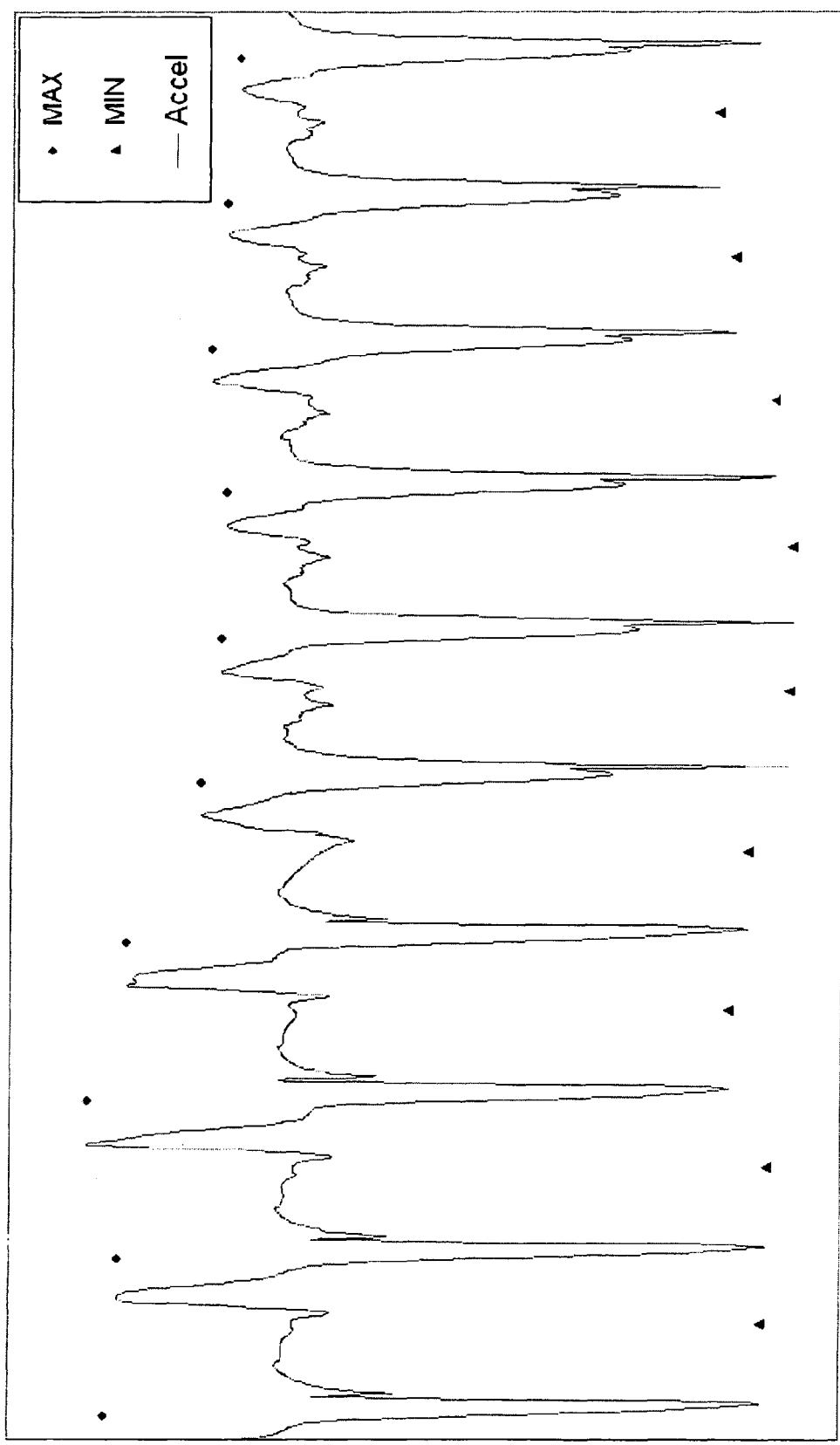
FIG. 5 shows a diagram of acceleration measurement according to the invention.

FIG. 5 shows a diagram of acceleration measurement according to the invention. In the solution according to the invention, the acceleration in one or several directions of the cyclic motion of locomotion is measured. In the solution according to the invention, the speed of progress can be computed by means of the acceleration stage characteristic acceleration a+ and the braking stage characteristic acceleration a−. The acceleration signal can suitably be filtered mechanically, electronically analogically and/or digitally in order to obtain reliable and exact speed data. In the example depicted in FIG. 5, the characteristic acceleration values a+ and a− of the foot or of some other body part can be used as a meter for the speed of progress.

In a solution according to the invention the speed can be calculated from the characteristic accelerations a+ and/or a− by simple arithmetic, for example as follows:

$$v = f(a+), \text{ or}$$

$$v = f(a-), \text{ or}$$

$$v = f(a+, a-).$$

In a solution according to the invention, the polynome to be used in calculating speed can, at its simplest, be, for example:

$$f(a+) = k*|a+|, \text{ or}$$

$$f(a-) = k*|a-|,$$

where k is a constant.

The time $\Delta t_{pos}$ used up for one step or for a pair of steps measured at one foot is obtained as the time interval between two equivalent points, such as a maximum, a minimum, or the point of exceeding or falling below a certain value, on the acceleration graph derived from the measured acceleration values.

In a solution according to the invention, the step length $s_{step}$ or the length of a pair of steps $s_{pos}$ can thus be calculated using the formula:

$$s_{step} = \frac{1}{2} * v * \Delta t_{pos} \text{ or } s_{pos} = v * \Delta t_{pos}.$$

and, correspondingly, the rate of pairs of steps $f_{pos}$ or the step rate $f_{step}$ can be calculated using the formula:

$$f_{pos} = 1/\Delta t_{pos} \text{ or } 2/\Delta t_{pos}.$$

In a solution according to the invention, the step count, or the count of pairs of steps n can be calculated on the basis of the number n of equivalent points, such as a maximum, a minimum or a point of exceeding or falling below a certain value, on the acceleration graph derived from the measured acceleration values. Further, in a solution according to the invention, the distance covered s can be calculated as the sum of the step lengths or the lengths of the pairs of steps:

$$s = 2 * \sum_{i=1}^{n} s_{step}(i) \text{ or } s = \sum_{i=1}^{n} s_{pos}(i).$$

In the solution according to the invention, the speed estimate suffers a minimal impact from the zero point error in the acceleration sensor or from gravitation coupling into the metering signal caused by inclination. In the solution according to the invention, the characteristic acceleration values a+ and a− are used, which values are large numbers in comparison with aforementioned interference. Further, the ways of locomotion, e.g. walking, running, and skiing, can be distinguished from each other based on acceleration maximum and minimum, the characteristic acceleration values a+ and a−, and/or the step rate.

In the solution according to the invention, based on the acceleration values measured during the step cycles, step cycle-specific characteristic acceleration values a+ and a− are defined, by means of which values the speed, the step rate, the step length, and the distance can be calculated with low power consumption using simple arithmetic.

The system, even if not calibrated, provides good precision. In order to improve the precision, individual calibration can be made for different modes of locomotion, e.g. running, walking, pole walking, or cross-country skiing. This can be done over a known distance using one speed or a multitude of speeds. By repeating the calibration, errors in speed and distance caused by stochastic errors are reduced, whereby precision is improved further. New calibration data can be added to the old data by suitable digital filtering. In addition, for further improvement of precision, the maximum and/or minimum acceleration data can be combined with contact time data, with change in altitude and terrain inclination data obtained from an altimeter, and/or with satellite navigation.

A complete step-by-step navigation unit is provided by adding to the step data the compass direction obtained from a magnetometer. The magnetometer can be calibrated, e.g. by rotating about a vertical axis. A direction error in the installation can be calibrated away by, e.g. walking a selected calibration route back and forth. Absolute coordinate data is obtained by combining this navigation unit with satellite navigation. Precision is further improved by combining the navigation unit with a map database and with an altimeter, since plausibility checks of the coordinates and movement can be made based on the altitude and changes in altitude.

By using an acceleration sensor signal perpendicular to the principal metering direction, a measure of the efficiency of progress is obtained.

In the solution according to the invention, characteristic acceleration values a+ and a− and/or maximum and/or minimum acceleration values obtained from an acceleration sensor of one or more axes can be used for estimating the speed of progress of a person. The signal of the acceleration sensor can be suitably filtered by means of mechanical, electronic, analog and/or digital filtering such, that the speed estimate is as exact and reliable as possible. In the solution according to the invention, step time, step rate, step length, and distance accumulated from the steps can be calculated based on the speed and the time interval between consecutive maxima or minima.

In the solution according to the invention, walking, running, and skiing, or some other way of progress can be distinguished from each other based on the maximum and minimum acceleration of the foot, the characteristic acceleration values a+ and a−, and/or the step rate.

In the solution according to the invention, the parameters for an average person's running and walking can be utilized without individual calibration of the measuring system. The measuring system can be calibrated by means of individual calibration on one speed or on a multitude of speeds for a certain way of progress, e.g. running or walking. In the solution according to the invention, the calibration of the measuring system can be repeated such, that new data is combined with the old data by digital filtering. The precision of the measuring system can be improved by combining contact time data with the maximum and minimum acceleration data.

In the solution according to the invention, the direction of each step or the direction of the distance covered observed from time to time can be determined by combining the speed estimate with the compass direction obtained from a magnetometer of 2 . . . 3 axes. A magnetometer and an installation direction error can be compensated for by rotating about a vertical axis and by walking a selected calibration route back and forth.

In the solution according to the invention, the efficiency of the progress can be estimated by combining with the characteristic acceleration values a+ and a− and/or with the maximum and/or minimum acceleration value data, values for acceleration measured at right angles to those.

By means of the method and the device according to the invention, a precision equal to that of the best methods presented above, is obtained by an implementation solution of significantly greater simplicity, utilizing one acceleration sensor without inclination compensation.

By means of the method and the device according to the invention, the complicated algorithms of the prior systems are avoided, and low cost, low power consumption, and small size are achieved.

The low power consumption of the method and device according to the invention allows a small battery and gives it long life, or even a battery-free solution based on, for example, recovery of the kinetic energy occurring in the measuring device (harvesting).

The simple measuring algorithm of the method and device according to the invention allows the computations to be performed entirely in the measuring unit, which reduces the need for data transfer from the measuring unit, and thus, the power consumption of data transmission utilizing radio traffic.

The small size of the measuring unit of the solution according to the invention allows the unit to be positioned, for example, inside a piece of footwear, attached to the shoestrings, or some other place or method requiring small size and weight.

The method according to the invention is applicable, for example, for fast as well as slow running, walking at various speeds, pole walking, cross-country skiing, downhill sports, roller skiing, roller-skating, skating, swimming, rowing and paddling.

The invention claimed is:

1. A method for displaying progress of a moving person, comprising:
measuring acceleration values of cyclic motion of locomotion of the moving person by means of an acceleration sensor;
determining step data as a function of step cycle-specific acceleration stage characteristic accelerations a+ and/or braking stage characteristic accelerations a− obtained from the acceleration values measured by means of the acceleration sensor;
obtaining compass readings of the moving person from a magnetometer; and
determining a traveled route of the moving person by means of the step data and the compass readings, wherein the step data includes an acceleration stage characteristic acceleration a+ obtained as a mean value of a digitally filtered acceleration sensor signal $a_{out}$ over a time selected during a positive half-cycle of the step cycle, and a braking stage characteristic acceleration a− obtained as a mean value of a digitally filtered acceleration sensor signal $a_{out}$ over a time selected during a negative half-cycle of the step cycle, wherein the method further comprises displaying, in a display unit, the traveled route of the moving person, and guiding the moving person via step by step navigation using the traveled route.

2. The method according to claim 1, wherein a function used in digital filtering is:

$$a_{out}=a_{in}/\sqrt{[1+(f/f_0)^2]},$$

where f is the frequency and $f_0$ is a suitably selected boundary frequency.

3. The method according to claim 1, wherein the function used in the digital filtering is digital weighing:

$$a_{out}(n)=(1-k)*a_{out}(n-1)+a_{in}*k,$$

where n indicates the n:th sample and k is the weighting factor.

4. The method according to claim 1, wherein speed v of the locomotion is calculated as a function of the step cycle-specific acceleration stage characteristic acceleration values a+ and/or a− as follows:

$$v=f(a+)=k*|a+|, \text{ or}$$

$$v=f(a-)=k*|a-|,$$

where k is a constant.

5. The method according to claim 1, wherein for calculating further quantities describing the progress of the moving person, the time used up in one pair of steps $\Delta t_{pos}$ is obtained as a time interval between two equivalent points, such as a maximum, a minimum, or a point of exceeding or falling below a certain value, on an acceleration graph given by the measured acceleration values.

6. The method according to claim 5, wherein the length of a step $s_{step}$ or the length of a pair of steps $s_{pos}$ is calculated using the formula:

$$s_{step} = \frac{1}{2}*v*\Delta t_{pos} \text{ or } s_{pos} = v*\Delta t_{pos}.$$

7. The method according to claim 6, wherein a step count n is calculated on the basis of the number n of equivalent points, such as a maximum, a minimum, or a point of exceeding or falling below a certain value, on the acceleration graph given by the measured acceleration values.

8. The method according to claim 6, wherein the distance covered s is calculated as the sum of the lengths of the steps or the pairs of steps:

$$s = 2*\sum_{i=1}^{n} s_{step}(i) \text{ or } s = \sum_{i=1}^{n} s_{pos}(i).$$

9. The method according to claim 5, wherein the rate of pairs of steps $f_{pos}$, or the step rate $f_{step}$, are calculated using the formula:

$$f_{pos}=1/\Delta t_{pos} \text{ or } f_{step}=2/\Delta t_{pos}.$$

10. The method according to claim 1, wherein the ways of progress comprises walking, running, and skiing, and wherein the ways of progress are distinguished based on acceleration maximum and minimum, the characteristic acceleration values a+ and a− and/or the step rate.

11. The method according to claim 10, wherein an individual calibration for each way of progress is made.

12. The method according to claim 1, wherein the method is applied for use in step-by-step navigation.

13. A device for displaying progress of a moving person, comprising:

a display unit; and a measuring unit that comprises an acceleration sensor, an analysis and diagnostic unit, and a magnetometer, wherein the acceleration sensor is configured to measure acceleration values of cyclic motion of locomotion of the moving person, wherein the magnetometer is configured to obtain compass readings of the moving person, wherein the analysis and diagnostic unit is configured to calculate step data as a function of step-cycle-specific acceleration stage characteristic accelerations a+ and braking stage characteristic accelerations a− obtained from acceleration values measured by the acceleration sensor during a step cycle, wherein the analysis and diagnostic unit is configured to determine the step data as a step-cycle-specific acceleration stage characteristic acceleration a+ as a mean value of a digitally filtered acceleration sensor signal $a_{out}$ over a time selected during a positive half-cycle of the step cycle, and a braking stage characteristic acceleration a− as a mean value of a digitally filtered acceleration sensor signal $a_{out}$ over a time selected during a negative half-cycle of the step cycle, wherein the analysis and diagnostic unit is configured to determine a traveled route of the moving person by means of the step data and the compass readings, wherein the display unit is configured to display the traveled route of the moving person, and to guide the moving person via step by step navigation using the traveled route.

14. The device according to claim 13, wherein the device is configured to use the following function in the digital filtering:

$$a_{out}=a_{in}/\sqrt{[1+(f/f_0)^2]},$$

where f is the frequency and $f_0$ is a suitably selected boundary frequency.

15. The device according to claim 13, wherein the device is configured to use this digital weighting function in the digital filtering:

$$a_{out}(n)=(1-k)*a_{out}(n-1)+a_{in}*k$$

where n indicates the n:th sample and k is the weighting factor.

16. The device according to claim 13, wherein the device is configured to calculate the speed v based on the characteristic accelerations a+ and/or a− as follows:

$$v=f(a+)=k*|a+|, \text{ or}$$

$$v=f(a-)=k*|a-|,$$

where k is a constant.

17. The device according to claim 13, wherein the device is configured to determine the time used up in one pair of steps $\Delta t_{pos}$ as a time interval between two equivalent points, such as a maximum, a minimum, or a point of exceeding or falling below a certain value, on an acceleration graph given by the measured acceleration values.

18. The device according to claim 17, wherein the device is configured to calculate the length of a step $s_{step}$ or the length of one pair of steps $s_{pos}$ using the formula:

$$s_{step} = \frac{1}{2} * v * \Delta t_{pos} \text{ or } s_{pos} = v * \Delta t_{pos}.$$

19. The device according to claim 18, wherein the device is configured to calculate a step count n on the basis of the number n of equivalent points, such as a maximum, a minimum, or a point of exceeding or falling below a certain value, on the acceleration graph given by the measured acceleration values.

20. The device according to claim 18, wherein the device is configured to calculate a distance covered s as the sum of the lengths of the steps or of the pairs of steps:

$$s = 2 * \sum_{i=1}^{n} s_{step}(i) \text{ or } s = \sum_{i=1}^{n} s_{pos}(i).$$

21. The device according to claim 17, wherein the device is configured to calculate the rate of pairs of steps $f_{pos}$ or the step rate $f_{step}$ using the formula:

$$f_{pos} = 1/\Delta t_{pos} \text{ or } f_{step} = 2/\Delta t_{pos}$$

22. The device according to claim 13, wherein the device is configured to distinguish between ways of progress comprising walking, running, and skiing, and wherein the ways of progress are distinguished based on acceleration maximum and minimum, the characteristic acceleration values a+ and a− and/or the step rate.

23. The device according to claim 22, wherein the device is configured to make an individual calibration for each way of progress.

24. The device according to claim 13, wherein the device is configured to be used in step-by-step navigation.

25. The device according to claim 24, wherein the device is configured to cooperate with an altimeter and/or satellite navigation devices.

26. The device according to claim 24, wherein the device is configured to receive and/or utilize data in map databases and/or terrain inclination data.

27. A piece of footwear, wherein the piece of footwear comprises a device according to claim 13.

28. A system for measuring the progress of a moving person, wherein the system comprises the device according to claim 13.

* * * * *